United States Patent
Kondrad et al.

(10) Patent No.: US 12,131,754 B2
(45) Date of Patent: Oct. 29, 2024

(54) APPARATUS, A METHOD AND A COMPUTER PROGRAM FOR VIDEO CODING AND DECODING

(71) Applicant: Nokia Technologies Oy, Espoo (FI)

(72) Inventors: Lukasz Kondrad, Munich (DE); Lauri Aleksi Ilola, Munich (DE); Emre Baris Aksu, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 17/753,493

(22) PCT Filed: Jul. 30, 2020

(86) PCT No.: PCT/EP2020/071557
§ 371 (c)(1),
(2) Date: Mar. 4, 2022

(87) PCT Pub. No.: WO2021/047820
PCT Pub. Date: Mar. 18, 2021

(65) Prior Publication Data
US 2022/0335978 A1    Oct. 20, 2022

(30) Foreign Application Priority Data

Sep. 13, 2019  (FI) .................................... 20195765

(51) Int. Cl.
*G11B 27/32* (2006.01)
*H04N 21/482* (2011.01)
*H04N 21/84* (2011.01)

(52) U.S. Cl.
CPC ......... *G11B 27/32* (2013.01); *H04N 21/4825* (2013.01); *H04N 21/84* (2013.01)

(58) Field of Classification Search
CPC .... G11B 27/32; H04N 21/4825; H04N 21/84; H04N 21/2353; H04N 21/23439
(Continued)

(56) References Cited

U.S. PATENT DOCUMENTS

2008/0052306 A1    2/2008  Wang et al.
2008/0056663 A1    3/2008  Tsujii et al.
(Continued)

FOREIGN PATENT DOCUMENTS

| EP | 3451675 A1 | 3/2019 |
| GB | 2538998 A | 12/2016 |
| WO | 2019/072795 A1 | 4/2019 |

OTHER PUBLICATIONS

Inger et al., "Text of ISO/IEC23008-12 2nd Edition CDAM1 support for predictive image coding, bursts, racketing, and other improvements", Systems, ISO/IEC/JTC1/SC29/WG11/ 18655, Jul. 2019.*

(Continued)

*Primary Examiner* — Thai Q Tran
*Assistant Examiner* — Stephen R Smith
(74) *Attorney, Agent, or Firm* — Harrington & Smith

(57) ABSTRACT

A method comprising: authoring a plurality of sets of media tracks comprising at least a first set of media tracks and a second set of media tracks into a media file format, wherein a subset of tracks of the first set comprises alternate data for each other and a subset of tracks of the second set comprises alternate data for each other; and including, in or along a bitstream comprising a media file including or inferring said media tracks, an indication that said subset of tracks of the first set are alternatives to each other and said subset of tracks of the second set are alternatives to each other upon playback of the media tracks.

18 Claims, 7 Drawing Sheets

(58) Field of Classification Search
USPC .......................................................... 386/241
See application file for complete search history.

(56) References Cited

U.S. PATENT DOCUMENTS

| | | | |
|---|---|---|---|
| 2009/0185619 | A1 | 7/2009 | Taleb et al. |
| 2010/0153395 | A1* | 6/2010 | Hannuksela ..... H04N 21/85406 707/E17.089 |
| 2016/0182927 | A1* | 6/2016 | Denoual .......... H04N 21/85406 725/109 |
| 2022/0014827 | A1* | 1/2022 | Denoual .............. H04N 21/845 |

OTHER PUBLICATIONS

"Information technology—Coded Representation of Immersive Media—Part 5: Video-based Point Cloud Compression", ISO/IEC JTC 1/SC 29/WG 11, ISO/IEC 23090-5, 2019, 102 pages.

"Information Technology—Coding Of Audio-Visual Objects—Part 12: ISO Base Media File Format", ISO/IEC 14496-12, Fifth edition, Dec. 15, 2015, 248 pages.

"Digital cellular telecommunications system (Phase 2+); Universal Mobile Telecommunications System (UMTS); LTE; Transparent end-to-end packet switchedstreaming service (PSS); 3GPP file format (3GP) (3GPP TS 26.244 version 9.0.0 Release 9)", ETSI TS 126 244, V9.0.0, Jan. 2010, 54 pages.

"Information Technology—Coding Of Audio-Visual Objects—Part 15: Advanced Video Coding (AVC) File Format", ISO/EC 14496-15, First edition, Apr. 15, 2004, 29 pages.

"Advanced Video Coding For Generic Audiovisual services", Series H: Audiovisual And Multimedia Systems, Infrastructure of audio-visual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Versatile Video Coding", Series H: Audiovisual and Multimedia Systems Infrastructure of audiovisual services—Coding of moving video, Recommendation ITU-T H.266, Aug. 2020, 516 pages.

Zakharchenko, "V-PCC Codec description", ISO/IEC JTC1/SC29/WG11 MPEG2018/N18017, 3DG, Oct. 2018, 33 pages.

Office action received for corresponding Finnish Patent Application No. 20195765, dated Apr. 7, 2020, 9 pages.

"3GPP Server File Format", 3GPP TSG-SA WG4 Meeting #25bis, S4-030181, Agenda: 6.7.2, Ericsson, Feb. 24-28, 2003, pp. 1-10.

Xu et al., "Use Cases and Implement of Track Alternatives and Track Grouping for V-PCC Content", Shanghai Jiao Tong University, ISO/IEC JTC1/SC29/WG11 MPEG2018/M45998, Jan. 2019, 5 pages.

International Search Report and Written Opinion received for corresponding Patent Cooperation Treaty Application No. PCT/EP2020/071557, dated Sep. 11, 2020, 13 pages.

"3rd Generation Partnership Project; Technical Specification Group Services and System Aspects; Transparent end-to-end packet switched streaming service (PSS); 3GPP file format (3GP) (Release 9)", 3GPP TS 26.244, V9.2.0, Jun. 2010, pp. 1-55.

Singer et al., "Text of ISO/IEC 23008-12 2nd Edition CDAM 1 support for predictive image coding, bursts, bracketing, and other improvements", Systems, ISO/IEC/JTC1/SC29/WG11/N18655, Jul. 2019, 28 pages.

Vadakital et al., "A grouping mechanism for the Image File Format (ISO/IEC 23008-12)", Nokia, ISO/IEC JTC1/SC29/WG11/MPEG2015/M35825 v2, Feb. 2015, 5 pages.

\* cited by examiner

Author a plurality of sets of media tracks comprising at least a first set of media tracks and a second set of media tracks into a media file format, wherein a subset of tracks of the first set comprises alternate data for each other and a subset of tracks of the second set comprises alternate data for each other (600)

Include, in or along a bitstream comprising a media file including or inferring said media tracks, an indication that said subset of tracks of the first set are alternatives to each other and said subset of tracks of the second set are alternatives to each other upon playback of the media tracks (602)

Fig. 6

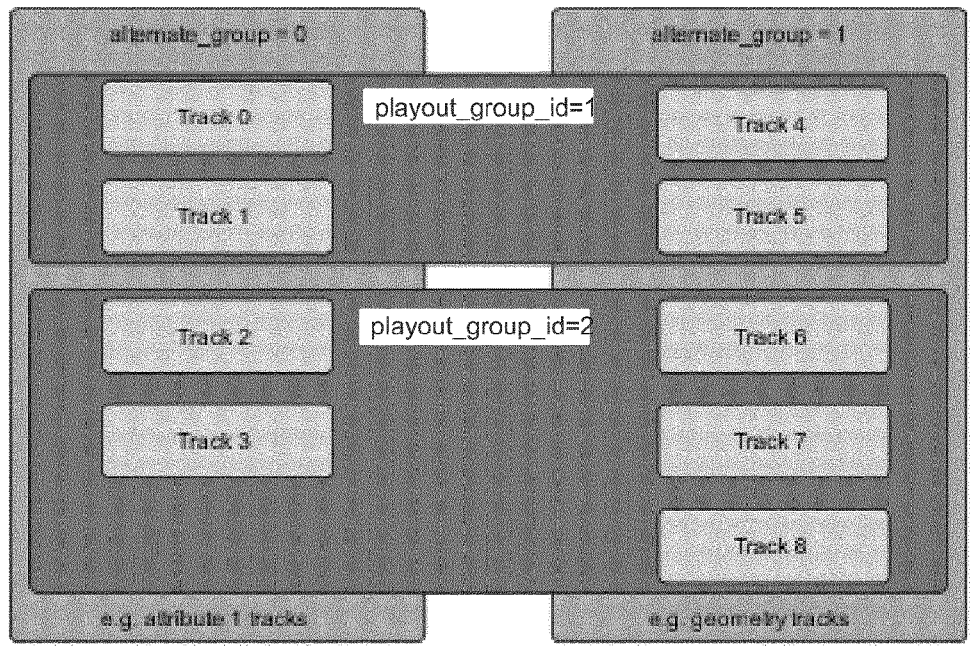

Fig. 7

Receive a bitstream comprising a media file including or inferring a plurality of sets of media tracks comprising at least a first set of media tracks and a second set of media tracks (800)

Receive, from or along said bitstream, an indication that a subset of tracks of the first set comprises alternatives to each other and a subset of tracks of the second set comprises alternatives to each other upon playback of the media tracks (802)

Select at most one track from the subset of tracks of the first set and at most one track from the subset of tracks of the second set for the playback (804)

Fig. 8

APPARATUS, A METHOD AND A COMPUTER PROGRAM FOR VIDEO CODING AND DECODING

RELATED APPLICATION

This application claims priority to PCT Application No. PCT/EP2020/071557, filed on Jul. 30, 2020, which claims priority to FI Application No. 20195765, filed on Sep. 13, 2019, each of which is incorporated herein by reference in its entirety.

TECHNICAL FIELD

The present invention relates to an apparatus, a method and a computer program for video coding and decoding.

BACKGROUND

Box-structured and hierarchical file format concepts have been widely used for media storage and sharing. Available media file format standards include ISO base media file format (ISO/IEC 14496-12, which may be abbreviated ISOBMFF), and its various derivatives. ISOBMFF allows storage of timely captured audio/visual media streams, called media tracks. The metadata which describes the track is separated from the encoded bitstream itself. Upon playback, a file parser may then select a suitable track to be extracted and played back.

ISOBMFF contains a particular feature called "alternate tracks", which enables signaling any time-wise equivalent alternatives of a media. Thus, various mutually alternative media tracks may be grouped, and only one media track among the alternatives should be played back during the presentation time. The playback may typically comprise combining media tracks from a plurality of groups, such as an audio track combined with one or more video tracks, or combining tracks of various sub-bitstreams of video-based point cloud compression (V-PCC).

However, while the different mutually alternative media tracks may have dependency with each other and/or a particular subset of another group of mutually alternative media tracks, there is no mechanism for indicating such relations between groups or subsets of tracks. This limits the possibilities of a content creator for controlling the playback as desired.

SUMMARY

Now in order to at least alleviate the above problems, an enhanced method for indicating track grouping is introduced herein.

The scope of protection sought for various embodiments of the invention is set out by the independent claims. The embodiments and features, if any, described in this specification that do not fall under the scope of the independent claims are to be interpreted as examples useful for understanding various embodiments of the invention.

A method according to a first aspect comprises authoring a plurality of sets of media tracks comprising at least a first set of media tracks and a second set of media tracks into a media file format, wherein a subset of tracks of the first set comprises alternate data for each other and a subset of tracks of the second set comprises alternate data for each other; and including, in or along a bitstream comprising a media file including or inferring said media tracks, an indication that said subset of tracks of the first set are alternatives to each other and said subset of tracks of the second set are alternatives to each other upon playback of the media tracks.

According to an embodiment, the method further comprises indicating that only one track from the subset of tracks of the first set is allowed to be played back simultaneously with any track from said subset of tracks of the second set.

According to an embodiment, said indication is configured to be carried out a syntax element defining a playout group.

According to an embodiment, said indication is configured to be carried out a syntax element defining a track group.

According to an embodiment, said indication is configured to be carried out a syntax element defining an entity group.

An apparatus according to a second aspect comprises means for authoring a plurality of sets of media tracks comprising at least a first set of media tracks and a second set of media tracks into a media file format, wherein a subset of tracks of the first set comprises alternate data for each other and a subset of tracks of the second set comprises alternate data for each other; and means for including, in or along a bitstream comprising a media file including or inferring said media tracks, an indication that said subset of tracks of the first set are alternatives to each other and said subset of tracks of the second set are alternatives to each other upon playback of the media tracks A third aspect relates to an apparatus comprising at least one processor and at least one memory, said at least one memory stored with computer program code thereon, the at least one memory and the computer program code configured to, with the at least one processor, cause the apparatus at least to perform: author a plurality of sets of media tracks comprising at least a first set of media tracks and a second set of media tracks into a media file format, wherein a subset of tracks of the first set comprises alternate data for each other and a subset of tracks of the second set comprises alternate data for each other; and include, in or along a bitstream comprising a media file including or inferring said media tracks, an indication that said subset of tracks of the first set are alternatives to each other and said subset of tracks of the second set are alternatives to each other upon playback of the media tracks.

A method according to a fourth aspect comprises: receiving a bitstream comprising a media file including or inferring a plurality of sets of media tracks comprising at least a first set of media tracks and a second set of media tracks; receiving, from or along said bitstream, an indication that a subset of tracks of the first set comprises alternatives to each other and a subset of tracks of the second set comprises alternatives to each other upon playback of the media tracks; and selecting at most one track from the subset of tracks of the first set and at most one track from the subset of tracks of the second set for the playback.

An apparatus according to a fifth aspect comprises: means for receiving a bitstream comprising a media file including or inferring a plurality of sets of media tracks comprising at least a first set of media tracks and a second set of media tracks; means for receiving, from or along said bitstream, an indication that a subset of tracks of the first set comprises alternatives to each other and a subset of tracks of the second set comprises alternatives to each other upon playback of the media tracks; and means for selecting at most one track from the subset of tracks of the first set and at most one track from the subset of tracks of the second set for the playback.

An apparatus according to a sixth aspect comprises at least one processor and at least one memory, said at least one memory stored with computer program code thereon, the at least one memory and the computer program code configured to, with the at least one processor, cause the apparatus at least to perform: receive a bitstream comprising a media file including or inferring a plurality of sets of media tracks comprising at least a first set of media tracks and a second set of media tracks; receive, from or along said bitstream, an indication that a subset of tracks of the first set comprises alternatives to each other and a subset of tracks of the second set comprises alternatives to each other upon playback of the media tracks; and select at most one track from the subset of tracks of the first set and at most one track from the subset of tracks of the second set for the playback.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which:

FIG. 6 shows a flow chart of a media file authoring method according to an embodiment of the invention;

FIG. 7 shows an example of grouping of tracks according to an embodiment of the invention;

FIG. 8 shows a flow chart of a media file reading method according to an embodiment of the invention.

DETAILED DESCRIPTION OF SOME EXAMPLE EMBODIMENTS

Figure 1:
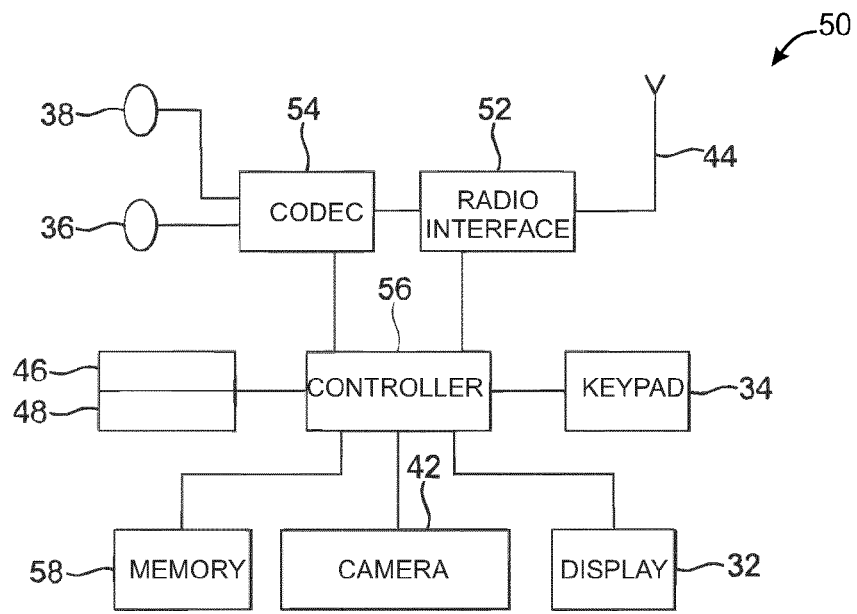
FIG. 1 shows schematically an electronic device employing embodiments of the invention.
Figure 2:
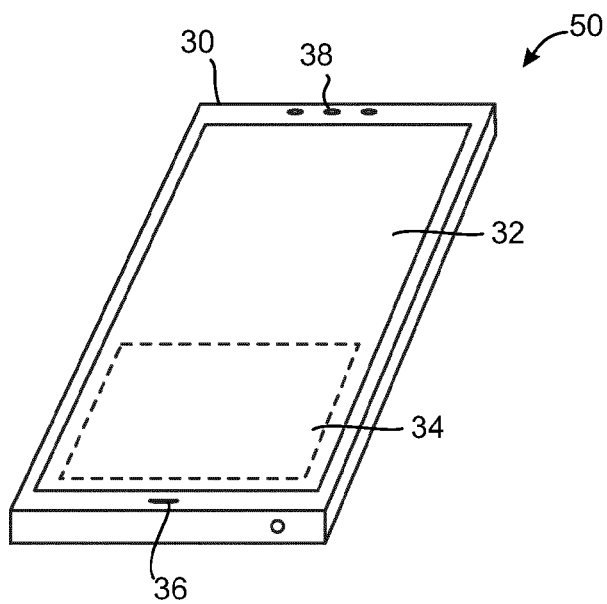
FIG. 2 shows schematically a user equipment suitable for employing embodiments of the invention.

The following describes in further detail suitable apparatus and possible mechanisms for indicating track grouping. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
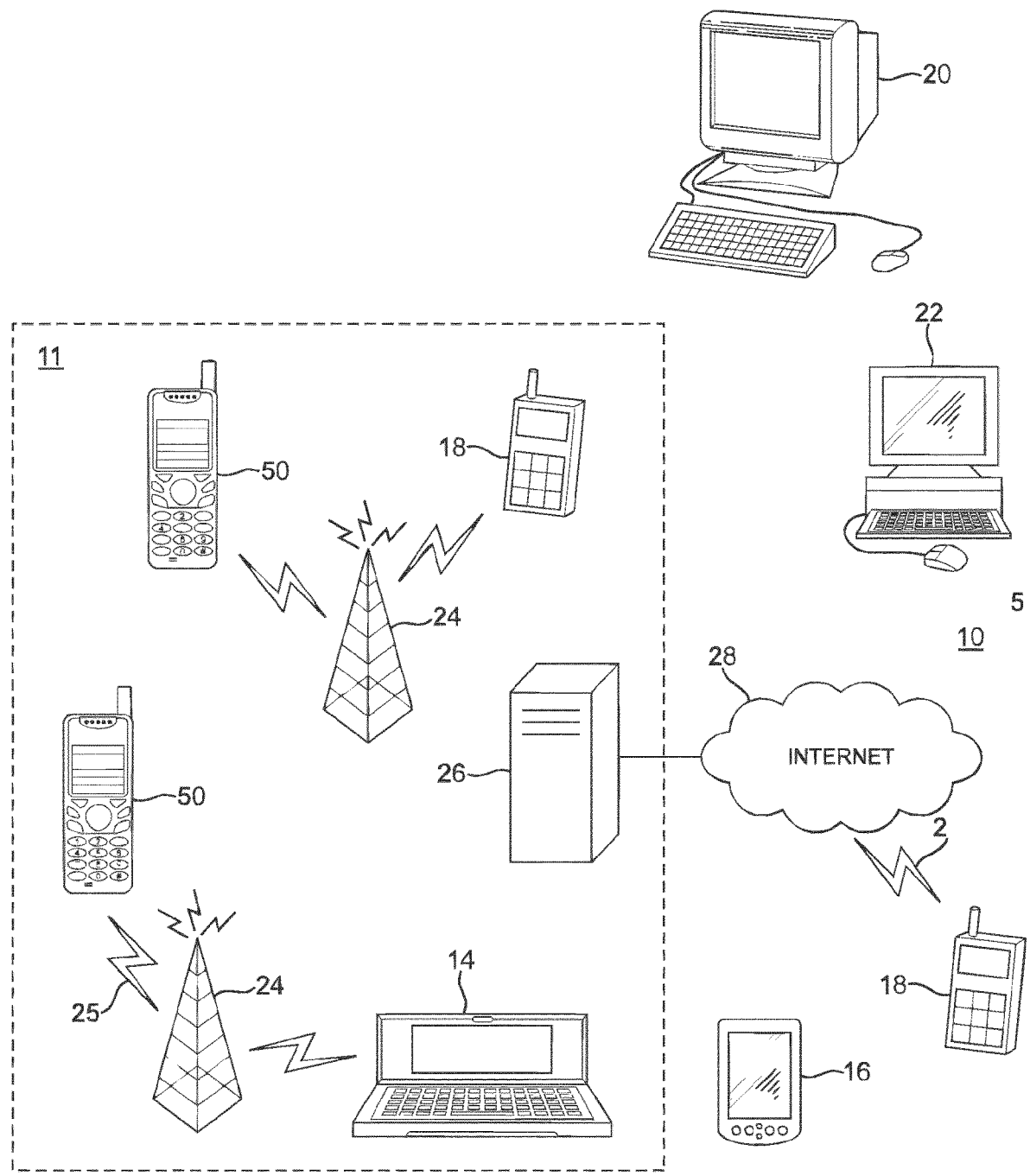
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UNITS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Box-structured and hierarchical file format concepts have been widely used for media storage and sharing. Available media file format standards include ISO base media file format (ISO/IEC 14496-12, which may be abbreviated ISOBMFF), and its derivatives, such as MP4 and 3GPP file formats, e.g. the file format for NAL unit structured video (ISO/IEC 14496-15).

ISOBMFF allows storage of timely captured audio/visual media streams, called media tracks. The metadata which describes the track is separated from the encoded bitstream itself. The format provides mechanisms to access media data in a codec-agnostic fashion from file parser perspective.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
    unsigned int(32) track_IDs[ ];
}
``` track_IDs may be specified as an array of integers providing the track identifiers of the referenced tracks or track_group_id values of the referenced track groups. Each value of track_IDs[i], where i is a valid index to the track_IDs[ ] array, is an integer that provides a reference from the containing track to the track with track_ID equal to track_IDs[i] or to the track group with both track_group_id equal to track_IDs[i] and a particular bit (e.g. the least significant bit) of the flags field of TrackGroupTypeBox equal to 1. When a track_group_id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. Track groups are not used to indicate dependency relationships between tracks. Instead, the TrackReferenceBox is used for such purposes.

The syntax of TrackGroupBox is the following:

```
aligned(8) class TrackGroupBox('trgr') {
}
aligned(8) class TrackGroupTypeBox(unsigned int(32)
track_group_type) extends FullBox(track_group_type, version = 0,
flags = 0)
{
    unsigned int(32) track_group_id;
    // the remaining data may be specified for a particular
    track_group_type
}
```

Alternate Tracks

ISOBMFF contains a particular feature called "alternate tracks". This feature enables signaling any time-wise equivalent alternatives of a media. This is signaled using a particular "alternate_group" field in the track header box:

```
aligned(8) class TrackHeaderBox
    extends FullBox('tkhd', version, flags){
    if (version==1) {
        unsigned int(64)creation_time;
        unsigned int(64)modification_time;
        unsigned int(32)track_ID;
        const unsigned int(32)   reserved = 0;
        unsigned int(64)duration;
    } else { // version==0
        unsigned int(32)creation_time;
        unsigned int(32)modification_time;
        unsigned int(32)track_ID;
        const unsigned int(32)   reserved = 0;
        unsigned int(32)duration;
    }
    const unsigned int(32)[2]   reserved = 0;
    template int(16) layer = 0;
    template int(16) alternate_group = 0;
    template int(16)volume = {if track_is_audio 0x0100 else 0};
    const unsigned int(16)  reserved = 0;
    template int(32)[9]   matrix=
        { 0x00010000,0,0,0,0x00010000,0,0,0,0x40000000 };
        // unity matrix
    unsigned int(32) width;
    unsigned int(32) height;
}
``` alternate_group is an integer that specifies a group or collection of tracks. If this field is 0 there is no information on possible relations to other tracks. If this field is not 0, it should be the same for tracks that contain alternate data for one another and different for tracks belonging to different such groups. Only one track within an alternate group should be played or streamed at any one time, and must be distinguishable from other tracks in the group via attributes such as bitrate, codec, language, packet size etc. A group may have only one member.

Typically, alternate grouping field indicates alternatives of a media track such as:

Different languages of the same audio track

Different resolution or bitrate options of the same media track

Different view of the 2D scene which is time-wise aligned with the main 2D scene (i.e. different camera angle)

Only one media track among the alternatives should be played back during the presentation time. This restriction comes from the ISOBMFF specification and the alternate_group field definition. The playback behavior for playing back multiple such media tracks is undefined.

Media players typically read the alternate grouping information and create a tree-structured information which groups the tracks together and then select the first track (i.e. lowest indexed) in the alternative tracks for initial playback. Moreover, the user can also manually switch between the alternatives.

Entity Groups

An entity group is a grouping of items, which may also group tracks. An entity may be regarded as a common term for an item and a track, and a referenced entity can be resolved to either an item or a track. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. When GroupsListBox is present in a file-level MetaBox, there is no item_ID value in ItemInfoBox in any file-level MetaBox that is equal to the track_ID value in any TrackHeaderBox.

GroupsListBox contains EntityToGroupBoxes, each specifying one entity group. The four-character box type of EntityToGroupBox denotes a defined grouping type.

The 'altr' entity grouping type has been specifies as follows: The items and tracks mapped to this grouping are alternatives to each other, and only one of them should be played (when the mapped items and tracks are part of the presentation; e.g. are displayable image items or tracks) or processed by other means (when the mapped items or tracks are not part of the presentation; e.g. are metadata). A player should select the first entity from the list of entity_id values that it can process (e.g. decode and play for mapped items and tracks that are part of the presentation) and that suits the application needs. Any entity_id value shall be mapped to only one grouping of type 'altr'. An alternate group of entities consists of those items and tracks that are mapped to the same entity group of type 'altr'.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

A video codec comprises an encoder that transforms the input video into a compressed representation suited for storage/transmission, and a decoder that can decompress the compressed video representation back into a viewable form. An encoder may discard some information in the original video sequence in order to represent the video in a more compact form (i.e. at lower bitrate).

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or interchanged between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be "unfolded" or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

The 2D video standards include, for example, H.264/AVC standard, which was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The standardization of the Versatile Video Coding (VVC, H.266, or H.266/VVC) standard has been started in the Joint Video Experts Team (WET) of ITU-T and MPEG.

Figure 4A:
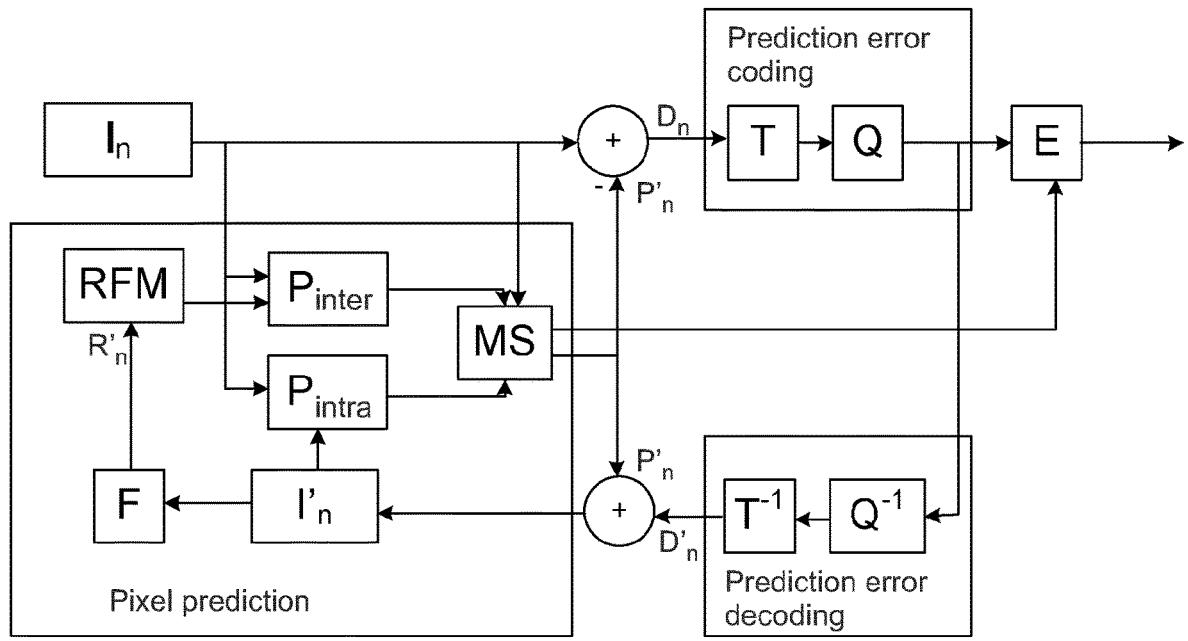
FIGS. 4a and 4b show schematically an encoder and a decoder suitable for implementing embodiments of the invention.
Figure 4B:
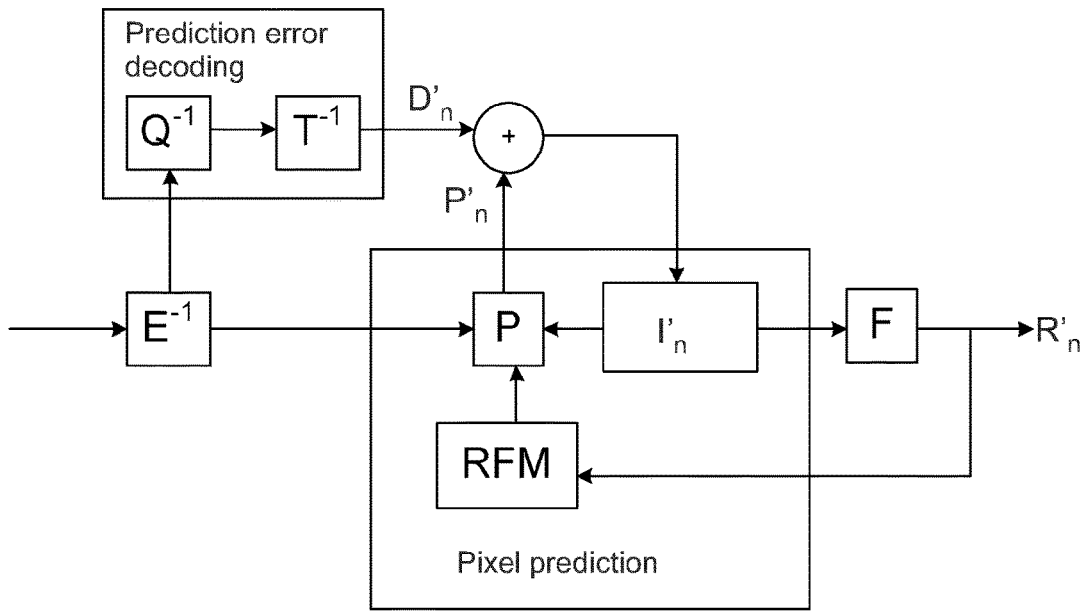

FIGS. 4a and 4b show an encoder and decoder for encoding and decoding the 2D texture pictures, geometry pictures and/or auxiliary pictures. A video codec consists of an encoder that transforms an input video into a compressed representation suited for storage/transmission and a decoder that can decompress the compressed video representation back into a viewable form. Typically, the encoder discards and/or loses some information in the original video sequence in order to represent the video in a more compact form (that is, at lower bitrate). An example of an encoding process is illustrated in FIG. 4a. FIG. 4a illustrates an image to be encoded (I″); a predicted representation of an image block (P′″); a prediction error signal (D″); a reconstructed prediction error signal (D′″); a preliminary reconstructed image (I′″); a final reconstructed image (R′″); a transform (T) and inverse transform (T$^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 4b. FIG. 4b illustrates a predicted representation of an image block (P'''); a reconstructed prediction error signal (D'''); a preliminary reconstructed image (I'''); a final reconstructed image (R'''); an inverse transform ($T^{-1}$); an inverse quantization ($Q^{-1}$); an entropy decoding ($E^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Many video encoders partition a picture into blocks along a block grid. For example, in the High Efficiency Video Coding (HEVC) standard, the following partitioning and definitions are used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

An attribute picture may be defined as a picture that comprises additional information related to an associated texture picture. An attribute picture may for example comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture image and texture picture may be used interchangeably. Terms geometry image and geometry picture may be used interchangeably. A specific type of a geometry image is a depth image. Embodiments described in relation to a geometry image equally apply to a depth image, and embodiments described in relation to a depth image equally apply to a geometry image. Terms attribute image and attribute picture may be used interchangeably. A geometry picture and/or an attribute picture may be treated as an auxiliary picture in video/image encoding and/or decoding.

Figure 5A:
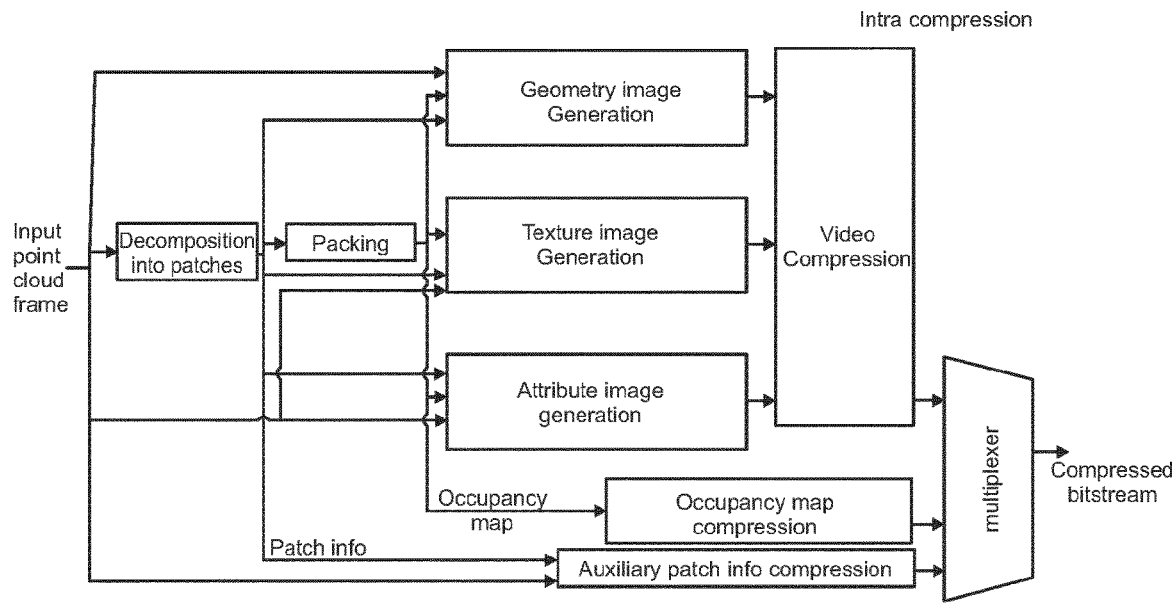
FIGS. 5a and 5b illustrate an overview of exemplified compression/decompression processes.
Figure 5B:
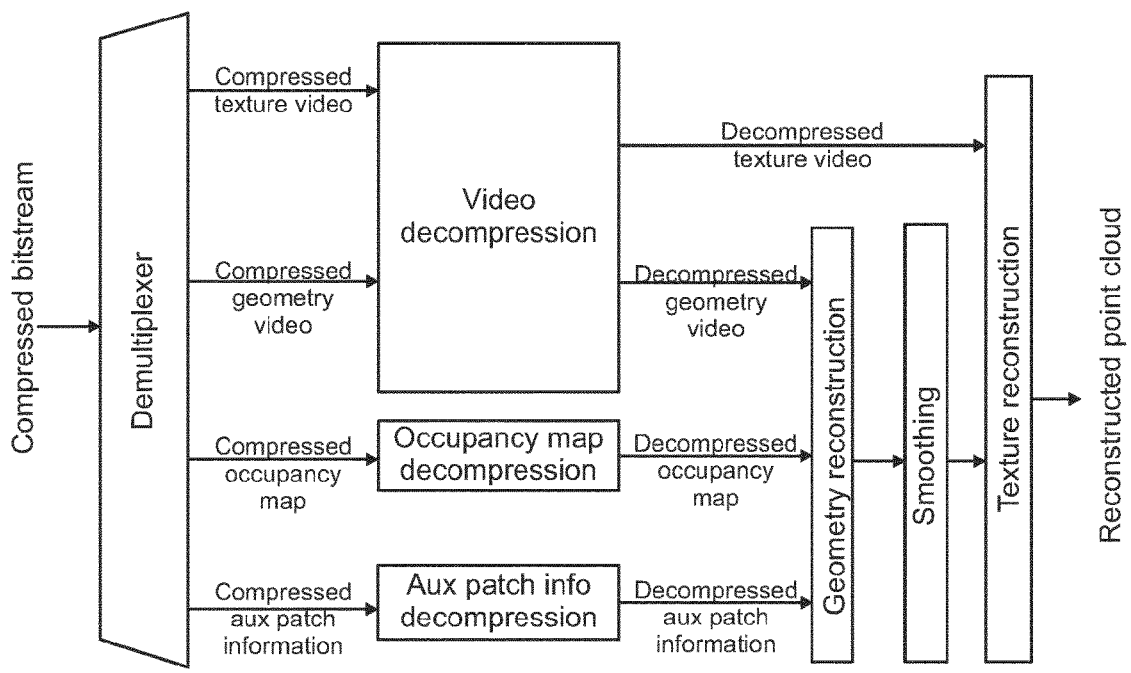

FIGS. 5a and 5b illustrate an overview of exemplified compression/decompression processes. The processes may be applied, for example, in Point Cloud Coding (PCC) according to MPEG standard. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

Each point cloud frame represents a dataset of points within a 3D volumetric space that has unique coordinates and attributes. The patch generation process decomposes the point cloud frame by converting 3D samples to 2D samples on a given projection plane using a strategy that provides the best compression. The patch generation process aims at decomposing the point cloud into a minimum number of patches with smooth boundaries, while also minimizing the reconstruction error.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

The image generation process exploits the 3D to 2D mapping computed during the packing process to store the geometry and texture of the point cloud as images. In order to better handle the case of multiple points being projected to the same pixel, each patch is projected onto two images, referred to as layers. The generated videos may have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points. A padding process may be applied for filling the empty space between patches in order to generate a piecewise smooth image suited for video compression. The generated images/layers are stored as video frames and compressed using a video codec.

In the auxiliary patch information compression, a plurality of metadata is encoded/decoded for every patch, including e.g. an index of the projection plane, 2D bounding box and 3D location of the patch represented in terms of depth, tangential shift and bi-tangential shift. Also, mapping information providing for each T×T block with its associated patch index is encoded. The compressed auxiliary patch may also be referred to as an attribute image.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches. The occupancy map compression leverages the auxiliary information in order to detect the empty T×T blocks (i.e., blocks with patch index 0).

The point cloud geometry reconstruction process exploits the occupancy map information in order to detect the non-empty pixels in the geometry/texture images/layers. The 3D positions of the points associated with those pixels are computed by levering the auxiliary patch information and the geometry images.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

Thus, a V-PCC encoder generates, in addition to texture image bitstream, two or more video streams (occupancy map, geometry and zero or more attributes). A geometry image is generated based on input point cloud, occupancy map and decoded occupancy map information. An attribute image is generated based on input point cloud, reconstructed occupancy map and geometry information, and smoothed geometry information. Each of the occupancy map, geometry, and attribute bitstreams can be stored as separate tracks.

A content creator may decide to generate a number of versions of occupancy map, geometry and attributes video streams that target various devices (e.g. different processing power, different display capability) and network conditions. The different versions of occupancy map, geometry, and attribute video streams may be stored in separate tracks and grouped together using alternate_group mechanism of TrackHeaderBox, as described above. For example, occupancy map1, occupancy image2 and occupancy image3 may be grouped together as alternate group1, and attribute map1, attribute image2 and attribute image3 may be grouped together as alternate group2. The alternate_group mechanism of TrackHeaderBox ensures that only one track within an alternate group should be played or streamed at any one time, i.e. only one occupancy map track, one geometry track and one track per attribute will be played at one time.

However, the different versions of occupancy map, geometry and attributes may have dependency between each other. In that case only some combination of the tracks from different alternate groups should be played together. E.g. one track from alternate_group of attributes shall be played together with a particular track from alternate_group of geometry. This may be necessary to have exact matching of object boundaries between geometry and attribute(s). Boundaries that are not matching exactly between geometry and attribute(s) may cause visible rendering artefacts, such as "flying pixels". It is even more important to pair the correct occupancy track with the matching geometry track as combination of different quality geometry and occupancy map may easily end up generating warped edges around patch boundaries.

It is noted that the problem is not limited to the storage of V-PCC bitstreams only, but the similar problem may be encountered in many other multimedia use cases. For example, a movie content contained in ISOBMFF can have a version of tracks targeted for minors and for adults. Video and audio tracks for minor can be alerted to remove unappropriated language and scenes and those tracks shall be played together. Moreover, a movie can have video tracks with different resolutions targeting different screen sizes. Content creator may wish to indicate that devices with small screen resolution shall be played with stereo audio track, while devices with high resolution can also be played with a spatial (5.1 etc.) audio track. It is also possible that a 360-degree video track shall be played with a spatial audio track, while the content may be offered also as a conventional 2D video track that shall be played with a stereoscopic audio track. In the upcoming ISO/IEC standard 23090-12 "Coded representation of immersive media, Part 12: Immersive Video", also referred to as MPEG MIV, specific geometry atlas may be only paired with specific texture atlas and a similar grouping mechanism may be utilized, as such. A further example use case relates to "forked" story telling films as popularized by Black Mirror Bandersnatch, where specific paths of forked stories may need to be grouped together.

The following categorization can be made between tracks stored in the same file:

A set of tracks complements each other in playback. Examples include the following:
  Monoscopic audio tracks may represent different microphone directions of a multi-microphone capture device, out of which a binaural signal is mixed as post-processing (after decoding).
  Video tracks may represent different camera directions of a multi-camera capture device, out of which a monoscopic or stereoscopic video signal is rendered as post-processing (after decoding).
  360-degree 3DoF video is split to sub-pictures, each stored as separate sub-picture track in the file.
  Volumetric video (e.g. point cloud video or MPEG MIV) is transmitted with different types of tracks (e.g. geometry, attribute, occupancy).
  Players and devices that have the capability of post-processing after decoding can utilize these kinds of tracks.
A track may represent "pre-rendered" content. For example, an audio track may be a coded representation of a stereoscopic or 5.1 loudspeaker setup. In another example, a video track may be a coded representation of 360-degree equirectangular panorama video. These kinds of tracks typically do not require sophisticated post-processing after decoding but may also provide less flexibility compared to the tracks of the previous bullet point.

However, there is currently no mechanism in the ISOBMFF specification which allows indicating relations between groups of tracks. It is not currently possible to indicate in ISOBMFF that a file contains a set of tracks complementing each other in playback, while this set of tracks is an alternative to another set of one or more tracks.

Now an improved method for indicating track grouping is introduced in order to at least alleviate the above problems.

The method according to an aspect, as shown in FIG. 6, comprises authoring (600) a plurality of sets of media tracks comprising at least a first set of media tracks and a second set of media tracks into a media file format, wherein a subset of tracks of the first set comprises alternate data for each other and a subset of tracks of the second set comprises alternate data for each other; and including (602), in or along a bitstream comprising a media file including or inferring said media tracks, an indication that said subset of tracks of the first set are alternatives to each other and said subset of tracks of the second set are alternatives to each other upon playback of the media tracks.

Thus, instead of being able to indicate only that one of the tracks of one alternate group of tracks is to be played back with one of the tracks of another alternate group of tracks, the approach enables to provide a greater variety of dependency links between a plurality of particular tracks from two or more alternate sets of tracks. This provides the content creator with substantially more possibilities for indicating various combinations of tracks to be played back simultaneously, depending on e.g. the properties of the playback device.

This can be illustrated by an example shown in FIG. 7, where two sets of alternate media tracks are disclosed. The first set of tracks, which may be referred to as alternate_group 0, comprises tracks Track0, Track1, Track2 and Track3. The second set of tracks, which may be referred to as alternate_group 1, comprises tracks Track4, Track5, Track6, Track7 and Track8. If implemented e.g. in delivery of V-PCC bitstreams, the first set of alternate tracks may comprise e.g. attribute image tracks, and the second set of alternate tracks may comprise e.g. geometry image tracks. The first set of alternate tracks (alternate_group 0) is divided into two subsets, the first subset comprising tracks Track0, Track1, and the second subset comprising tracks Track2, Track3. Similarly, the second set of alternate tracks (alternate_group 1) is divided into two subsets, the first subset comprising tracks Track4, Track5, and the second subset comprising tracks Track6, Track7, Track 8.

Now there is provided a further link between the subsets of different alternate tracks. In this example, the first subset of alternate_group 0, i.e. Track0 and Track1, is grouped together with the first subset of alternate_group 1, i.e. Track4 and Track5. This grouping indicates that Track0 may be played back simultaneously with either Track4 or Track5, and similarly, Track1 may be played back simultaneously with either Track4 or Track5. Accordingly, various combinations of tracks to played back simultaneously, depending on e.g. the properties of the playback device, can be indicated more flexibly.

In the same manner, the second subset of alternate_group 0, i.e. Track2 and Track3, is grouped together with the second subset of alternate_group 1, i.e. Track6, Track7 and Track8. Thus, Track3 may be played back simultaneously with any of Track6, Track7 or Track8, and similarly, Track3 may be played back simultaneously with any of Track6, Track7 or Track8.

According to an embodiment, the method further comprises indicating that only one track from the subset of tracks of the first set is allowed to be played back simultaneously with any track from said subset of tracks of the second set.

Hence, even if the subset may comprise a plurality of mutually alternative tracks, for ensuring the operation of the playback device, it is indicated that only track is selected for streaming or playback at a time.

Embodiments enable storing representational alternatives of multiple media tracks grouped together to form a contextually meaningful representation is defined. In some embodiments, groups of media tracks are marked as alternatives of each other e.g. by utilizing a presentation level data structure. With this data structure or a similar mechanism, a file generator can mark which media tracks must be played back simultaneously and what the alternative media track groups are. The player may also use this data structure or alike to understand which media tracks must be played back simultaneously and what the alternatives are.

According to an embodiment, said indication is configured to be carried out a syntax element defining a playout group.

Herein, a new playout group type (e.g. 'tply') may be specified for user data mechanism, wherein a track playout group box may be contained in the user data box of the track it modifies, for example as follows:

```
Definition
Box Type: 'tply'
Container: UserDataBox of the corresponding TrackBox
Mandatory: No
Quantity: Zero or One
Syntax
aligned(8) class TrackPlayoutGroupBox
    extends FullBox('tply', version = 0, 0) {
    template int(32) playout_group_id = 0;
}
```

The following semantics may be applied: playout_group_id is an integer that specifies a group or collection of tracks. If this field is 0 (default value) or if the TrackPlayoutGroupBox is absent there is no information on whether the track should be playout with other tracks. If this integer is not 0 it shall be the same for tracks that shall be playout or streamed together. In FIG. 7, the value of playout_group_id is 1 for Track0, Track1, Track4 and Track5 and the value of playout_group_id is 2 for Track2, Track3, Track6, Track7 and Track8. Only one track within an alternate group should be played or streamed at any one time.

According to an embodiment, said indication is configured to be carried out a syntax element defining a track group.

Herein, a new track group type (e.g. 'tply') may be specified for the track group mechanism for example as follows:

```
Definition
Box Type: 'tply'
Container: TrackGroupBox
Mandatory: No
Quantity: Zero or More
Syntax
aligned(8) class TrackPlayoutGroupBox
    extends TrackGroupTypeBox('tply') {
    // track_group_id is inherited from TrackGroupTypeBox syntax
}
```

The following semantics may be applied: track_group_id is an integer that specifies a group or collection of tracks. If the TrackPlayoutGroupBox is absent there is no information on whether the track should be playout with other tracks. track_group_id shall be the same for tracks that shall be played out or streamed together. Only one track within an alternate group should be played or streamed at any one time.

According to an embodiment, said indication is configured to be carried out a syntax element defining an entity group.

Herein, a new entity group type (e.g. 'tply') may be specified for the entity group mechanism for example as follows:

```
Definition
Box Type: 'tply'
Container: GroupsListBox
Mandatory: No
Quantity: Zero or More
Syntax
aligned(8) class PlayoutGroupBox
    extends EntityToGroupBox('tply') {
}
```

If the PlayoutGroupBox is absent there is no information on which items or tracks should be played out together. Items or tracks in the same PlayoutGroupBox shall be played out together. When PlayoutGroupBox contains alternatives, indicated by the alternate_group syntax or the ' altr' entity group, only one item or track within an alternate group should be played or streamed at any one time.

According to an embodiment, one or more grouping properties are indicated (e.g. by a file write) and/or parsed (e.g. by a file reader) for a playout group. The properties may but need not include one or more "alternation types", each indicating a factor in which the grouped entities differ from each. Alternatively or additionally, the properties may but need not include one or more "common factors", each indicating a factor shared by the grouped entities. An alternation type and a common factor may for example be, but is not limited to, one or more of the following: bitrate, image size (e.g. in width and height in units of pixels), codec type.

In the above, a reference is made for "playout group", which may comprise alternatives for playout but could likewise be considered to apply to any other type of processing instead of or in addition to playout.

In some embodiments above, semantics imply that the entities included in a playout group are alternatives, as indicated e.g. by the alternate_group syntax element. It needs to be understood that embodiments similarly apply when hierarchical grouping structures are explicitly indicated rather than implied. For example, it may be indicated (e.g. by a file writer) and/or parsed (e.g. by a file reader) whether an entity or track group is a sub-group of a parent entity or track group, and if so, the type and identifier for the parent entity or track group may be indicated (e.g. by a file writer) and/or parsed (e.g. by a file reader).

Another aspect relates to operation of a decoder or a file reader/parser upon receiving the above-described bitstream with said indications. A method, which is shown in FIG. 8, comprises receiving (800) a bitstream comprising a media file including or inferring a plurality of sets of media tracks comprising at least a first set of media tracks and a second set of media tracks; receiving (802), from or along said bitstream, an indication that a subset of tracks of the first set comprises alternatives to each other and a subset of tracks of the second set comprises alternatives to each other upon playback of the media tracks; and selecting (804) at most one track from the subset of tracks of the first set and at most one track from the subset of tracks of the second set for the playback.

The above embodiments may be implemented in an apparatus comprising means for authoring a plurality of sets of media tracks comprising at least a first set of media tracks and a second set of media tracks into a media file format, wherein a subset of tracks of the first set comprises alternate data for each other and a subset of tracks of the second set comprises alternate data for each other; and means for including, in or along a bitstream comprising a media file including or inferring said media tracks, an indication that said subset of tracks of the first set are alternatives to each other and said subset of tracks of the second set are alternatives to each other upon playback of the media tracks.

The above embodiments may likewise be implemented in an apparatus comprising at least one processor and at least one memory, said at least one memory stored with computer program code thereon, the at least one memory and the computer program code configured to, with the at least one processor, cause the apparatus at least to perform: author a plurality of sets of media tracks comprising at least a first set of media tracks and a second set of media tracks into a media file format, wherein a subset of tracks of the first set comprises alternate data for each other and a subset of tracks of the second set comprises alternate data for each other; and include, in or along a bitstream comprising a media file including or inferring said media tracks, an indication that said subset of tracks of the first set are alternatives to each other and said subset of tracks of the second set are alternatives to each other upon playback of the media tracks.

The decoding aspects may be implemented in an apparatus comprising: means for receiving a bitstream comprising a media file including or inferring a plurality of sets of media tracks comprising at least a first set of media tracks and a second set of media tracks; means for receiving, from or along said bitstream, an indication that a subset of tracks of the first set comprises alternatives to each other and a subset of tracks of the second set comprises alternatives to each other upon playback of the media tracks; and means for selecting at most one track from the subset of tracks of the first set and at most one track from the subset of tracks of the second set for the playback.

The decoding aspects may likewise be implemented in an apparatus comprising at least one processor and at least one memory, said at least one memory stored with computer program code thereon, the at least one memory and the computer program code configured to, with the at least one processor, cause the apparatus at least to perform: receive a bitstream comprising a media file including or inferring a plurality of sets of media tracks comprising at least a first set of media tracks and a second set of media tracks; receive, from or along said bitstream, an indication that a subset of tracks of the first set comprises alternatives to each other and a subset of tracks of the second set comprises alternatives to each other upon playback of the media tracks; and select at most one track from the subset of tracks of the first set and at most one track from the subset of tracks of the second set for the playback.

Such apparatuses may comprise e.g. the functional units disclosed in any of the FIGS. 1, 2, 4a, 4b, 5a and 5b for implementing the embodiments.

Figure 9:
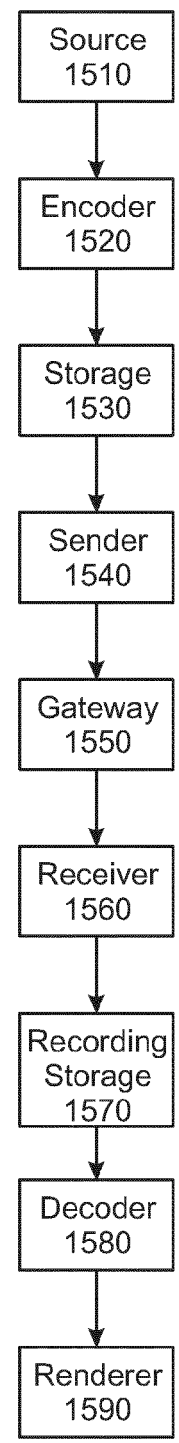
FIG. 9 shows a schematic diagram of an example multimedia communication system within which various embodiments may be implemented.

FIG. 9 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, viewpoint switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Thus, the decoder may comprise means for requesting at least one decoder reset picture of the second representation for carrying out bitrate adaptation between the first representation and a third representation. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described in relation to ISOBMFF. It needs to be understood that embodiments could be similarly realized with any other file format, such as Matroska, with similar capability and/or structures as those in ISOBMFF.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   authoring a plurality of sets of media tracks comprising at least a first set of media tracks and a second set of media tracks into a media file format, wherein each set of the first and second media tracks comprises a plurality of subsets, wherein there is a first subset of media tracks of the first set of media tracks, and a second subset of media tracks of the first set of media tracks, and there is a first subset of media tracks of the second set of media tracks, and a second subset of media tracks of the second set of media tracks; and
   including, in or along a bitstream comprising a media file comprising or inferring said media tracks, indication that said first subset of media tracks of the second set of media tracks are alternatives to each other upon playback of the media tracks and that only one media track from the first subset of the media tracks of the first set is allowed to be played back simultaneously with any track from said first subset of the media tracks of the second set, and said second subset of media tracks of the second set of media tracks are alternatives to each other upon playback of the media tracks and that only one media track from the second subset of the media tracks of the first set is allowed to be played back simultaneously with any track from said second subset of the media tracks of the first set.

2. The method according to claim 1, wherein said indication is configured to be carried out as a syntax element defining a playout group.

3. The method according to claim 1, wherein said indication is configured to be carried out as a syntax element defining a track group.

4. The method according to claim 1, wherein said indication is configured to be carried out as a syntax element defining an entity group.

5. The method according to claim 1, wherein media tracks in the first subset of the first set comprise alternate data for each other, media tracks in the second subset of the first set comprise alternate data for each other.

6. The method according to claim 5, wherein media tracks in the first and second subsets of the first set comprise alternate data for each other, and media tracks in the first and second subsets of the second set comprise alternate data for each other.

7. An apparatus comprising at least one processor and at least one memory, said at least one memory storing instructions that, when executed by the at least one processor, cause the apparatus at least to perform;
   authoring a plurality of sets of media tracks comprising at least a first set of media tracks and a second set of media tracks into a media file format, wherein each set of the first and second media tracks comprises a plurality of subsets, wherein there is a first subset of media tracks of the first set of media tracks, and a second subset of media tracks of the first set of media tracks, and there is a first subset of media tracks of the second set of media tracks, and a second subset of media tracks of the second set of media tracks; and
   including, in or along a bitstream comprising a media file comprising or inferring said media tracks, indication that said first subset of media tracks of the second set of media tracks are alternatives to each other upon playback of the media tracks and that only one media track from the first subset of the media tracks of the first set is allowed to be played back simultaneously with any track from said first subset of the media tracks of the second set, and said second subset of media tracks of the second set of media tracks are alternatives to each other upon playback of the media tracks and that only one media track from the second subset of the media tracks of the first set is allowed to be played back simultaneously with any track from said second subset of the media tracks of the first set.

8. The apparatus according to claim 7, wherein said indication is configured to be carried out as a syntax element defining a playout group.

9. The apparatus according to claim 7, wherein said indication is configured to be carried out as a syntax element defining a track group.

10. The apparatus according to claim 7, wherein said indication is configured to be carried out as a syntax element defining an entity group.

11. The apparatus according to claim 7, wherein media tracks in the first subset of the first set comprise alternate data for each other, media tracks in the second subset of the first set comprise alternate data for each other.

12. The apparatus according to claim 11, wherein media tracks in the first and second subsets of the first set comprise alternate data for each other, and media tracks in the first and second subsets of the second set comprise alternate data for each other.

13. A method comprising:
   receiving a bitstream comprising a media file including or inferring a plurality of sets of media tracks comprising at least a first set of media tracks and a second set of media tracks, wherein each set of the first and second media tracks comprises a plurality of subsets, wherein there is a first subset of media tracks of the first set of media tracks and a second subset of media tracks and there is a first subset of media tracks of the second set of media tracks and a second subset of media tracks of the second set of media tracks;
   receiving, from or along said bitstream, indication that said first subset of media tracks of the second set of media tracks are alternatives to each other upon playback of the media tracks and that only one media track from the first subset of the media tracks of the first set is allowed to be played back simultaneously with any track from said first subset of the media tracks of the second set, and said second subset of tracks of the second set of media tracks are alternatives to each other upon playback of the media tracks and that only one media track from the second subset of the media tracks of the first set is allowed to be played back simultaneously with any track from said second subset of the media tracks of the second set;
   selecting media tracks for playback by selecting at most one media track from the first subset of media tracks of the first set of media tracks and at most one media track from the first subset of media tracks of the second set of media tracks for the playback, or selecting at most one media track from the second subset of media tracks of the first set of media tracks and at most one media track from the second subset of media tracks of the second set of media tracks for the playback; and
   playing back the selected media tracks.

14. The method according to claim 13, wherein media tracks in the first subset of the first set comprise alternate data for each other, media tracks in the second subset of the first set comprise alternate data for each other.

15. The method according to claim 14, wherein media tracks in the first and second subsets of the first set comprise alternate data for each other, and media tracks in the first and second subsets of the second set comprise alternate data for each other.

16. An apparatus comprising at least one processor and at least one memory, said at least one memory storing instructions that, when executed by the at least one processor, cause the apparatus at least to perform:
   receiving a bitstream comprising a media file including or inferring a plurality of sets of media tracks comprising at least a first set of media tracks and a second set of media tracks, wherein each set of the first and second media tracks comprises a plurality of subsets, wherein there is a first subset of media tracks of the first set of media tracks and a second subset of media tracks and there is a first subset of media tracks of the second set of media tracks and a second subset of media tracks of the second set of media tracks;
   receiving, from or along said bitstream, indication that said first subset of media tracks of the second set of media tracks are alternatives to each other upon playback of the media tracks and that only one media track from the first subset of the media tracks of the first set is allowed to be played back simultaneously with any track from said first subset of the media tracks of the second set, and said second subset of tracks of the second set of media tracks are alternatives to each other upon playback of the media tracks and that only one media track from the second subset of the media tracks of the first set is allowed to be played back simultaneously with any track from said second subset of the media tracks of the second set;
   selecting media tracks for playback by selecting at most one media track from the first subset of media tracks of the first set of media tracks and at most one media track from the first subset of media tracks of the second set of media tracks for the playback, or selecting at most one media track from the second subset of media tracks of the first set of media tracks and at most one media track from the second subset of media tracks of the second set of media tracks for the playback; and playing back the selected media tracks.

17. The apparatus according to claim 16, wherein media tracks in the first subset of the first set comprise alternate data for each other, media tracks in the second subset of the first set comprise alternate data for each other.

18. The apparatus according to claim 17, wherein media tracks in the first and second subsets of the first set comprise alternate data for each other, and media tracks in the first and second subsets of the second set comprise alternate data for each other.

* * * * *